United States Patent
Yarsevich

(12) 
(10) Patent No.: US 10,526,061 B2
(45) Date of Patent: Jan. 7, 2020

(54) LIFE RING AND METHOD OF MANUFACTURE

(71) Applicant: Taylor Made Group, LLC, Gloversville, NY (US)

(72) Inventor: Christopher James Yarsevich, Greenfield Center, NY (US)

(73) Assignee: TAYLOR MADE GROUP, LLC, Gloversville, NY (US)

( * ) Notice: Subject to any disclaimer, the term of this patent is extended or adjusted under 35 U.S.C. 154(b) by 0 days.

(21) Appl. No.: 15/962,146

(22) Filed: Apr. 25, 2018

(65) Prior Publication Data

US 2019/0329851 A1    Oct. 31, 2019

(51) Int. Cl.
| | |
|---|---|
| *B63C 9/08* | (2006.01) |
| *B29C 45/14* | (2006.01) |
| *B29K 75/00* | (2006.01) |
| *B29K 677/00* | (2006.01) |
| *B29K 667/00* | (2006.01) |
| *B29K 105/04* | (2006.01) |

(52) U.S. Cl.
CPC ........ *B63C 9/082* (2013.01); *B29C 45/14786* (2013.01); *B29K 2075/00* (2013.01); *B29K 2105/04* (2013.01); *B29K 2667/00* (2013.01); *B29K 2677/00* (2013.01); *B29K 2713/02* (2013.01)

(58) Field of Classification Search
CPC .... B63C 9/00; B63C 9/08; B63C 9/20; B63C 9/082; B29C 45/00; B29C 45/14; B29C 45/14786

USPC .......................................................... 441/81
See application file for complete search history.

(56) References Cited

U.S. PATENT DOCUMENTS

| | | | | |
|---|---|---|---|---|
| 2,105,110 | A * | 1/1938 | Driscoll | B63C 9/082 441/81 |
| 2,246,108 | A * | 6/1941 | Sermon | B63B 35/76 441/131 |
| 4,017,927 | A * | 4/1977 | Massey | B63C 9/082 441/81 |
| 4,033,276 | A | 7/1977 | Barr | |
| 4,059,859 | A | 11/1977 | Hull | |
| 4,416,640 | A | 11/1983 | Eickenhorst | |
| 4,464,132 | A * | 8/1984 | Mauck | B63C 9/082 441/81 |
| 4,523,913 | A * | 6/1985 | Kaino | B63C 9/20 441/81 |
| 4,702,715 | A | 10/1987 | Winick | |
| 4,976,642 | A | 12/1990 | Wilkie | |
| 6,818,091 | B1 * | 11/2004 | Holland | B32B 27/12 156/192 |
| 8,187,047 | B1 * | 5/2012 | Brooks | B63B 35/76 441/131 |

* cited by examiner

*Primary Examiner* — Lars A Olson
(74) *Attorney, Agent, or Firm* — Nixon & Vanderhye P.C.

(57) ABSTRACT

A life ring includes a cover formed of a knitted back polyester fabric with a top vinyl coating, and a urethane foam core within the cover. The cover and the urethane foam core are formed into a ring shape. By using the noted cover material, the life ring can be manufactured without a painting step, thereby reducing manufacturing costs and improving the consistency of the finished product.

13 Claims, 5 Drawing Sheets

LIFE RING AND METHOD OF MANUFACTURE

CROSS-REFERENCES TO RELATED APPLICATIONS (NOT APPLICABLE)

STATEMENT REGARDING FEDERALLY SPONSORED RESEARCH OR DEVELOPMENT (NOT APPLICABLE)

BACKGROUND

The invention relates to life rings and, more particularly, to life rings and a method of manufacturing life rings that utilize a knitted back polyester fabric with a top vinyl coating, which does not require paint.

Existing life rings are manufactured using an EVA foam material that is filled with urethane foam and subsequently painted. The resulting product suffers from inconsistent finishes, as the paint finish can vary widely depending on ambient conditions such as humidity and temperature. As such, the existing manufacturing process results in a life ring that may have a shiny finish or may have a more matte finish. These inconsistencies are undesirable to consumers.

Additionally, the existing EVA foam exterior does not pass the U.S. Coast Guard puncture test. The puncture test requires a life ring to resist a preset pointed tip with a seven pound force. The existing materials are also susceptible to rope abrasion and general abrasion where the painted surfaces can be scratched off or disturbed by contact with abrasive surfaces/objects.

BRIEF SUMMARY

It would thus be desirable to manufacture a life ring utilizing a cover material that does not require painting and that is more durable. The life ring of the described embodiments utilizes a UL (Underwriters Laboratories) approved knitted back polyester fabric with a top vinyl coating that is pre-colored such that it does not require paint and that is durable such that the life ring can pass the U.S. Coast Guard puncture test and is less susceptible to abrasion damage.

In an exemplary embodiment, a method of manufacturing a life ring includes the steps of (a) unrolling a section of a knitted back polyester fabric with a top vinyl coating; (b) cutting the section into a ring cover with a digital cutter; (c) securing the ring cover in a ring mold; (d) injecting the ring mold with urethane foam and permitting the urethane foam to cure; (e) removing the ring cover with the cured foam from the ring mold and trimming the ring cover with the cured foam; and (f) applying attachments. Steps (a)-(f) may be conducted without painting. Step (e) may be practiced by trimming an outside of the ring cover with the cured foam with a band saw and a rotary table. Step (e) may be further practiced by trimming an inside of the ring cover with the cured foam with a drum sander. Step (f) may be practiced by applying vinyl trim banding to an outside circumference and an inside circumference of the ring cover with the cured foam. In this context, step (f) may be further practiced by sewing beckets and rope to the ring cover with the cured foam without painting. In one embodiment, the method consists of steps (a)-(f).

In another exemplary embodiment, a method of manufacturing a life ring without painting includes the steps of (a) unrolling a section of a knitted back polyester fabric with a pre-colored top vinyl coating; (b) cutting the section into a ring cover with a digital cutter; (c) securing the ring cover in a ring mold; (d) injecting the ring mold with urethane foam and permitting the urethane foam to cure; (e) removing the ring cover with the cured foam from the ring mold and trimming the ring cover with the cured foam; and (f) without painting the ring cover with the cured foam, applying attachments.

In yet another exemplary embodiment, a life ring includes a cover formed of a knitted back polyester fabric with a top vinyl coating, and a urethane foam core within the cover. The cover and the urethane foam core are formed into a ring shape. The cover may be structured and configured to pass a standardized U.S. Coast Guard puncture test. The cover may be pre-colored such that no painting is required to manufacture the life ring.

BRIEF DESCRIPTION OF THE DRAWINGS

These and other aspects and advantages of the invention will be described in detail with reference to the accompanying drawings, in which.

DETAILED DESCRIPTION

Figure 6:
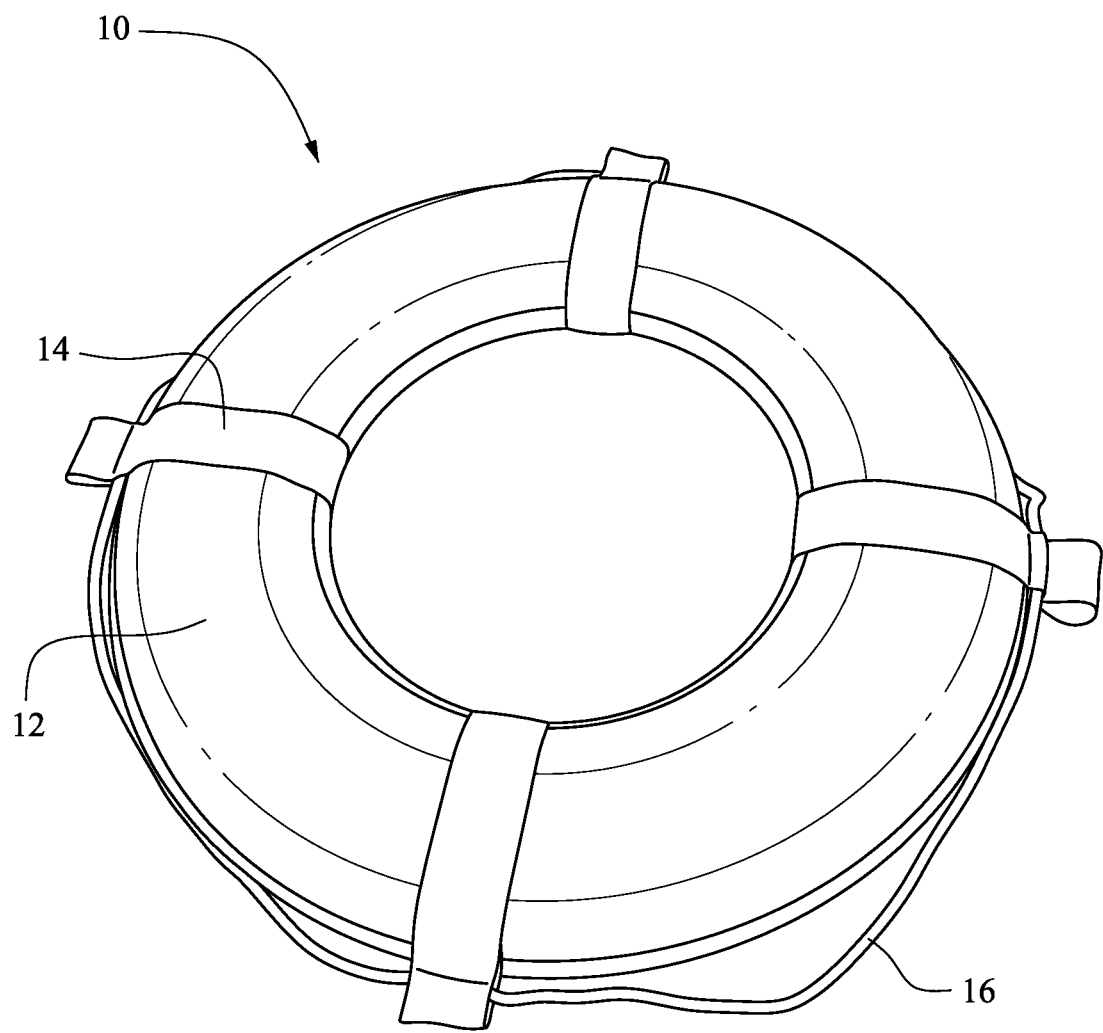
FIG. 6 shows the finished ring including sewn beckets and rope.

With reference to the drawings, FIG. 6 shows a finished life ring 10 according to the described embodiments. The life ring 10 includes a cover 12 formed of a knitted back polyester fabric with a top vinyl coating. The fabric begins as a linearly knitted polyester. The polyester fabric is then passed through a coating line where a vinyl coating is applied to the top side. The finished fabric has smooth vinyl on one side and polyester on the other. A urethane foam core is disposed within the cover, and the cover 12 and the urethane foam core are formed into a ring shape as shown.

The finished product also includes beckets 14 and rope 16 secured by sewing or the like to the ring cover 12.

By virtue of the specific material of the cover 12, the cover 12 and finished product are structured and configured to pass the U.S. Coast Guard puncture test. Moreover, since the cover 12 is pre-colored, no painting is required to manufacture the life ring 10. As a consequence, manufacturing costs can be reduced, and the consistency of the finished product can be improved.

Figure 1:
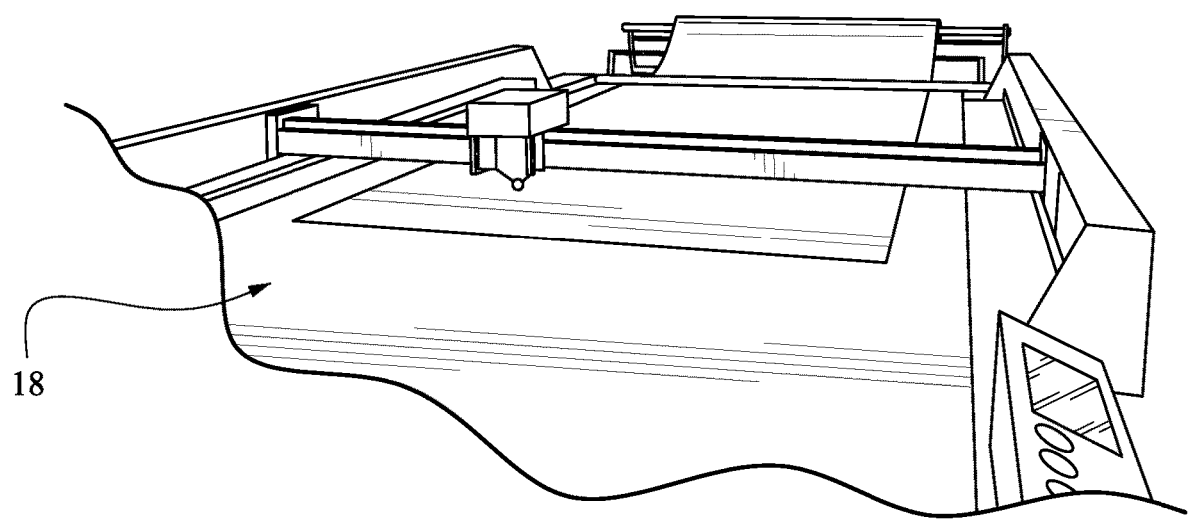
FIG. 1 shows the cover material being unrolled and prepared for cutting.

The cover material according to the described embodiments comes on rolls rather than in the form of large sheets as with the existing products. The material is pre-coated with vinyl, and as a consequence, the material does not require painting. Compared to the existing EVA foam sheets, the cover material is much stronger, puncture resistant and abrasion resistant among other advantages. FIG. 1 shows the cover material being unrolled in preparation for cutting by a digital cutter 18. The cover material comes on 55-inch wide rolls, about 50 yards per roll. The EVA foam material used with existing products comes in 4'×6' sheets. With the cover material of the described embodiments being on rolls rather than sheets, it is much quicker and easier to cut on the digital cutters. It is no longer required to manually load each sheet on the cutter; rather, the start of the roll is loaded onto the cutter, and after each cut it automatically advances and unrolls more material, saving time and cost.

Figure 2:
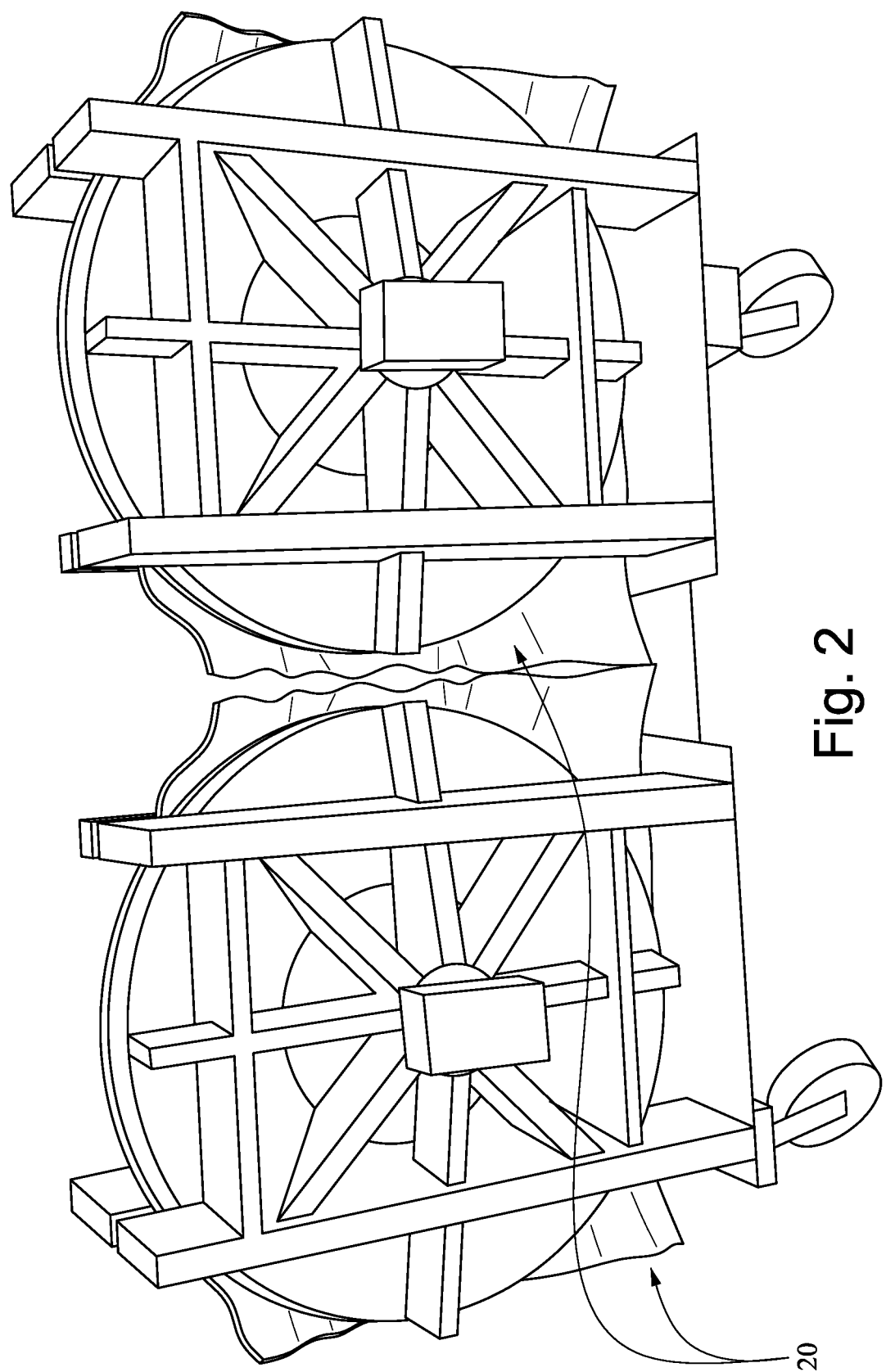
FIG. 2 shows the ring cover secured in a ring mold and the molding configuration.

After cutting with the digital cutter 18 as shown in FIG. 1, the cover material is placed in suitable molds 20 (FIG. 2), and the molds 20 are closed. The molds 20 are injected (filled) with urethane foam. The urethane foam expands and solidifies. After permitting the urethane foam to cure, the ring cover with the cured foam is removed from the ring mold 20, and the product is trimmed.

Figure 3:
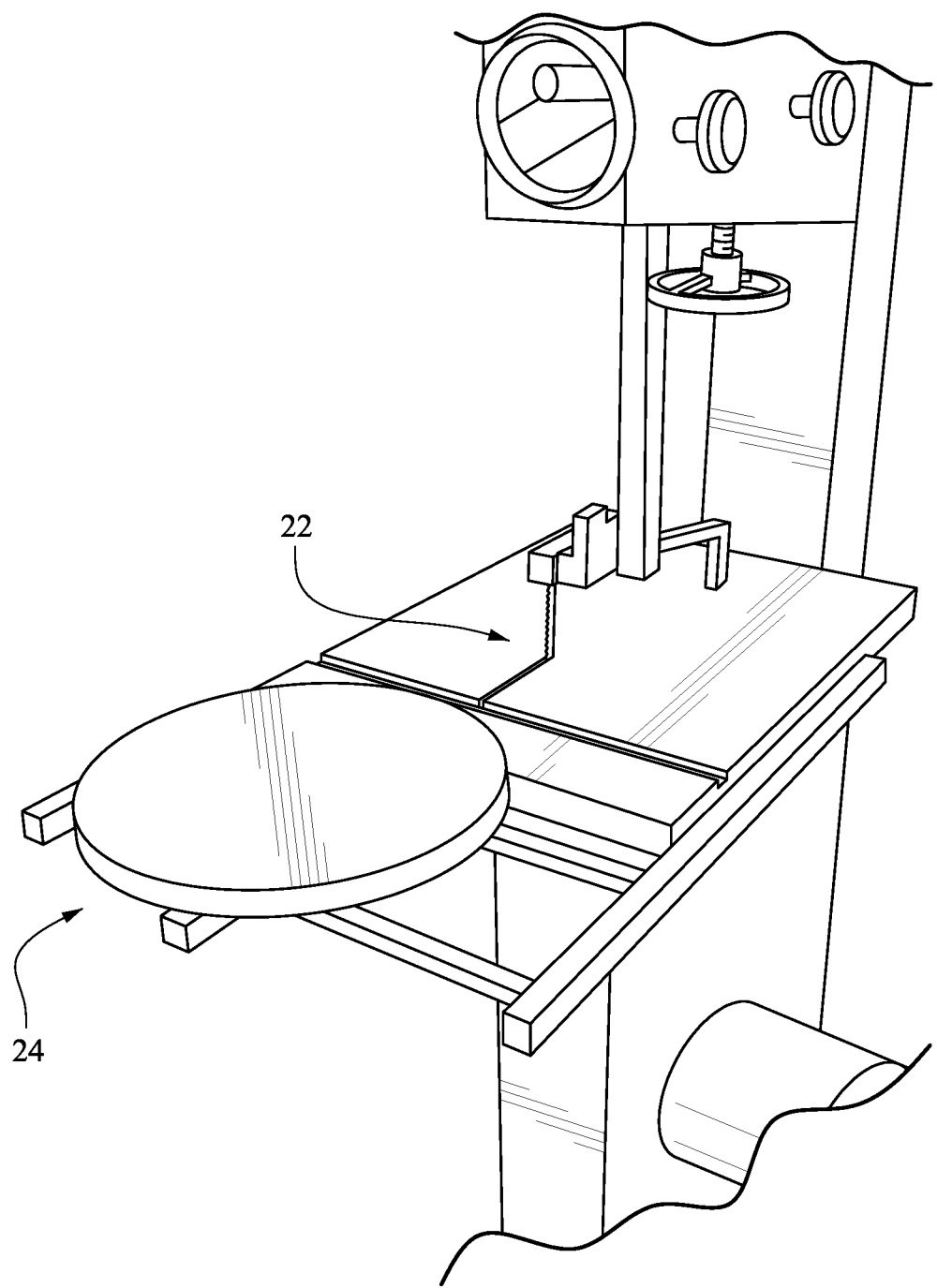
FIGS. 3 and 4 show the trimming process for the ring after removing the ring from the mold.
Figure 4:
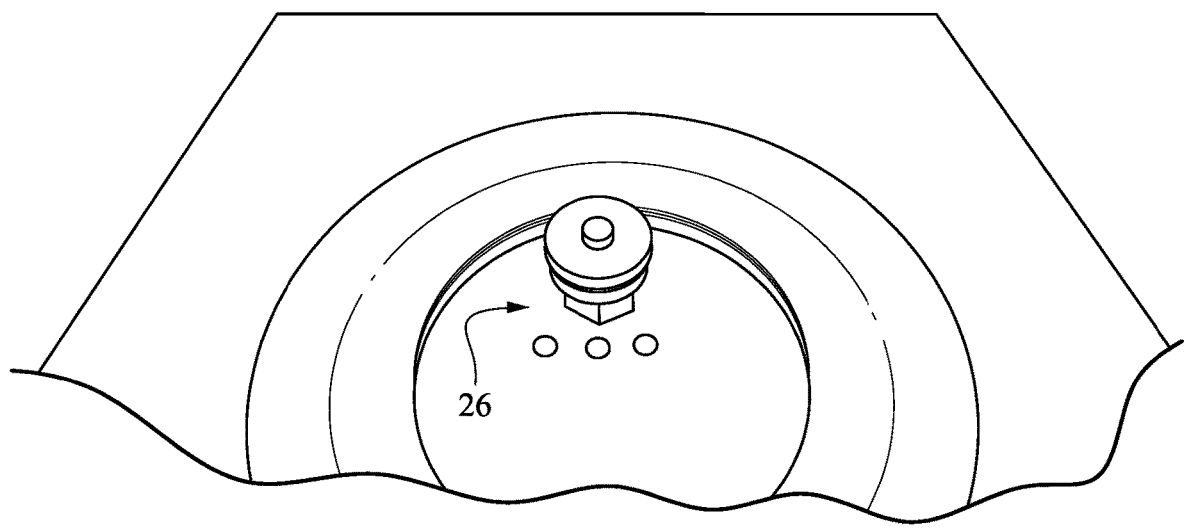
Figure 5:
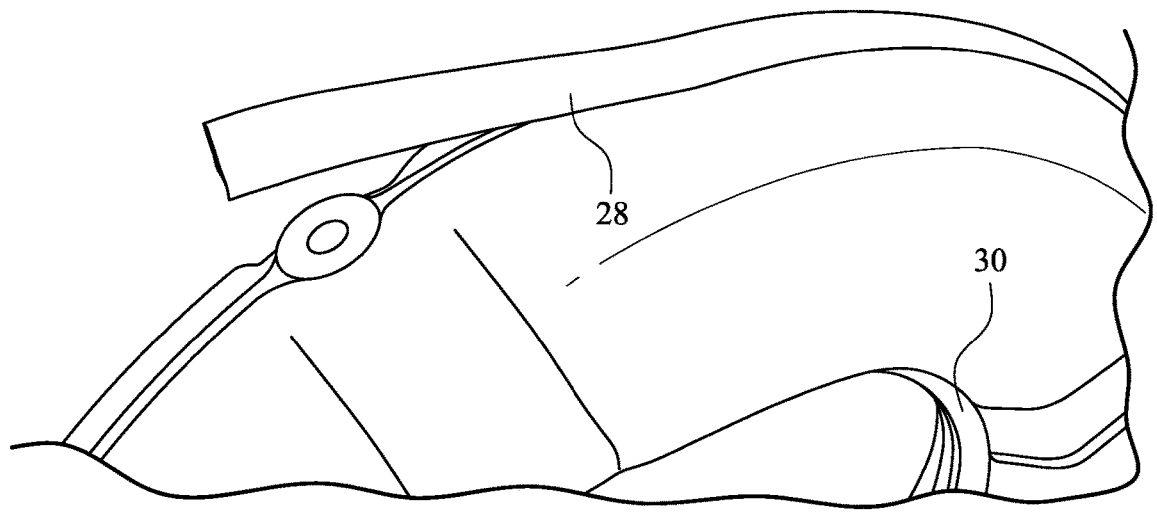
FIG. 5 shows vinyl trim banding applied to the outside and inside circumference of the ring.

For the trimming process, the existing product utilizes a hot knife cutter. The cover material of the described embodiments, however, is much stronger, and more tear and puncture resistant. As a consequence, a more aggressive cutter is required to trim off excess material. FIG. 3 shows the setup for trimming the outside of the ring cover with the cured foam with a band saw 22 and a rotary table 24. The inside of the ring cover with the cured foam is trimmed with a drum sander 26 as shown in FIG. 4. With reference to FIG. 5, after trimming, vinyl trim banding 28, 30 is applied to the outside and inside circumferences, respectively, to hide the parting line trimming.

At this point, the prior products were painted. With the cover material of the described embodiments, however, no painting is required, thereby saving manufacturing and material costs.

Subsequently, the beckets 14 and rope 16 are secured by sewing or the like to the trimmed and vinyl trim banded ring cover with the cured foam to complete the finished product shown in FIG. 6.

The life rings of the described embodiments have received UL approval. In one application, the life ring uses a white or orange cover material that does not require painting in the process. By eliminating the painting process, the manufacturing and materials costs can be reduced, and the life rings have a more consistent finish.

While the invention has been described in connection with what is presently considered to be the most practical and preferred embodiments, it is to be understood that the invention is not to be limited to the disclosed embodiments, but on the contrary, is intended to cover various modifications and equivalent arrangements included within the spirit and scope of the appended claims.

The invention claimed is:

1. A method of manufacturing a life ring comprising:
   (a) unrolling a section of a knitted back polyester fabric with a top vinyl coating;
   (b) cutting the section into a ring cover with a digital cutter;
   (c) securing the ring cover in a ring mold;
   (d) injecting the ring mold with urethane foam and permitting the urethane foam to cure;
   (e) removing the ring cover with the cured foam from the ring mold and trimming the ring cover with the cured foam; and
   (f) applying attachments.

2. A method according to claim 1, wherein steps (a)-(f) are conducted without painting.

3. A method according to claim 1, wherein step (e) is practiced by trimming an outside of the ring cover with the cured foam with a band saw and a rotary table.

4. A method according to claim 3, wherein step (e) is further practiced by trimming an inside of the ring cover with the cured foam with a drum sander.

5. A method according to claim 1, wherein step (f) is practiced by applying vinyl trim banding to an outside circumference and an inside circumference of the ring cover with the cured foam.

6. A method according to claim 5, wherein step (f) is further practiced by sewing beckets and rope to the ring cover with the cured foam without painting.

7. A method according to claim 1, wherein the method consists of steps (a)-(f).

8. A method of manufacturing a life ring without painting, the method comprising:
   (a) unrolling a section of a knitted back polyester fabric with a pre-colored top vinyl coating;
   (b) cutting the section into a ring cover with a digital cutter;
   (c) securing the ring cover in a ring mold;
   (d) injecting the ring mold with urethane foam and permitting the urethane foam to cure;
   (e) removing the ring cover with the cured foam from the ring mold and trimming the ring cover with the cured foam; and
   (f) without painting the ring cover with the cured foam, applying attachments.

9. A method according to claim 8, wherein step (e) is practiced by trimming an outside of the ring cover with the cured foam with a band saw and a rotary table.

10. A method according to claim 9, wherein step (e) is further practiced by trimming an inside of the ring cover with the cured foam with a drum sander.

11. A method according to claim 8, wherein step (f) is practiced by applying vinyl trim banding to an outside circumference and an inside circumference of the ring cover with the cured foam.

12. A method according to claim 11, wherein step (f) is further practiced by sewing beckets and rope to the ring cover with the cured foam without painting.

13. A method of manufacturing a life ring comprising:
   (a) unrolling a section of a knitted back polyester fabric with a top vinyl coating;
   (b) cutting the section into a ring cover with a digital cutter;
   (c) securing the ring cover in a ring mold;
   (d) inserting a foam in the ring mold;
   (e) removing the ring cover with the inserted foam from the ring mold and trimming the ring cover with the inserted foam; and
   (f) applying attachments.

\* \* \* \* \*